United States Patent [19]

Cisar et al.

[11] Patent Number: 4,834,798
[45] Date of Patent: May 30, 1989

[54] CORROSION RESISTANT REFRACTORY COATING

[75] Inventors: Alan J. Cisar, Sugar Land; Walter W. Henslee, Lake Jackson, both of Tex.

[73] Assignee: The Dow Chemical Company, Midland, Mich.

[21] Appl. No.: 178,098

[22] Filed: Apr. 6, 1988

Related U.S. Application Data

[63] Continuation-in-part of Ser. No. 84,251, Aug. 10, 1987, abandoned, Continuation-in-part of Ser. No. 184,189, Sep. 4, 1980, abandoned.

[51] Int. Cl.$^4$ .................. C04B 9/00; C04B 35/04
[52] U.S. Cl. .................. 106/14.12; 106/38.27; 501/120

[58] Field of Search .............. 106/14.12, 38.27; 501/120

[56] References Cited

U.S. PATENT DOCUMENTS 4,459,156 7/1984 Henslee et al. .............. 106/85

Primary Examiner—Paul Lieberman
Assistant Examiner—Christine A. Skane

[57] ABSTRACT

There is disclosed a coating compositions which can be produced from (1) a reactive $MgAl_2O_4$ spinel (2) aluminum acid phosphate moieties and phosphoric acid, (3) water, (4) optionally, non-reactive fillers, colorants and (5), also optionally, handling agents.

5 Claims, 1 Drawing Sheet

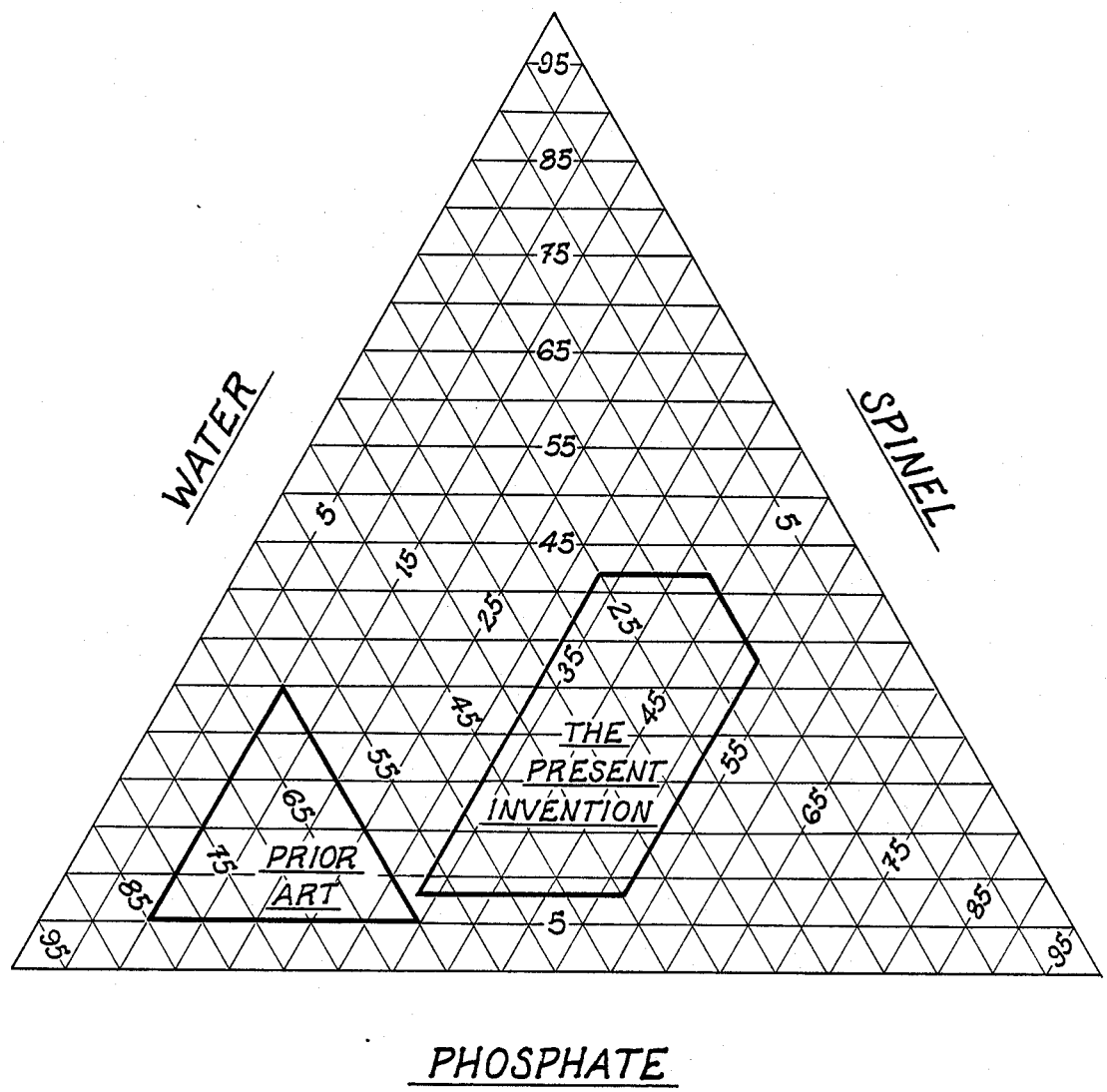

CORROSION RESISTANT REFRACTORY COATING

CROSS REFERENCE TO RELATED APPLICATIONS

This application is a continuation-in-part of application Ser. No. 084,251, filed Aug. 10, 1987 and its parent application Ser. No. 184,189, filed Sept. 4, 1980, now abandoned, and is related to application Ser. No. 299,430, filed Sept. 4, 1981 now U.S. Pat. No. 4,400,431 granted Aug. 23, 1983 and application Ser. No. 451,351, filed Dec. 20, 1982, now U.S. Pat. No. 4,459,156, issued July 10, 1984.

STATE OF THE ART

The following patents and literature references are deemed to represent art which is within the general field of $MgAl_2O_4$ spinels used in mortars, castables and coatings and the like employing phosphorous acids as a reactive component. U.S. Pat. Nos. 3,730,744, discloses aggregate cast shapes employing $Al(H_2PO_4)_3$ as the bonding solution which contains alkalizing ions as the curing agents; U.S. Pat. No. 3,285,758 teaches ammonium phosphate in combination with aluminum phosphate plus MgO (from calcined dolomite). Spinel is mentioned as an aggregate.

A fundamental review of phosphate bonding is found in J. AMER. CERAMIC SOCIETY, Vol. 133, No. 8, Aug. 1, 1950 by William Davide Kingery. Another review is found in Ceramic Bulletin, Vol. 56, No. 7, page 640 by J. E. Cassidy (1977). Other studies are as follows: Vol. 59, No. 7 (1980) by Francisco J. Gonzales and John W. Halloran, "Reaction of Orthophosphoric Acid with Several Forms of Aluminum Oxide" and an abstract of a Russian Scientific paper authored by L. B. Khoroshavin, V. A. Ryabin, I. E. Sipeiko, V. N. Naumov, G. A. Sychev, V. Ya. Pavlov, V. M. Chyrin, N. F. Serenko, B. V. Ponomarev, and E. P. Kosolapova; Eastern Institute of Refractories, Ural Scientific-Research Institute of Chemistry. Perm Chemical Plant. All-Union Scientific-Research Institute for the Power Supply in Nonferrous Metallurgy. This was translated from Ogneupory, No. 3, pp. 34–36, March, 1977.

The two review articles, the one by Kingery (covering the art to 1949) and the other by Cassidy (from 1949–1977) form a very complete picture of the state of technology on phosphate bonding. Materials listed as forming phosphate bonds with phosphoric acid are: $TiO_2$, CaO, FeO, $Fe_2O_3$, NiO, ZnO, $ZrO_2$, MgO, $Al_2O_3$, and $CrO_3$. These may be reacted as pure compounds or as constituents in mineral compositions, i.e., asbestos, bauxite or clay. The most common bonding mechanism using phosphoric acid is the reaction with alumina to form $Al(H_2PO_4)_3$. This is also the starting material in many formulations in place of $H_3PO_4$. $Al(H_2PO_4)_3$ further reacts with either alumina, clay or bauxite, resulting in orthophosphates ($MgHPO_4 \cdot 3H_2O$ or $AlH_3(PO_4)_2$) as the bond.

In the $H_3PO_4 + Al_2O_3$ system addition of $Mg^{+2}$, $Fe^{+3}$ or $Be^{+2}$ ions increase bonding strength but these ions also contribute to "premature" setting.

The patent literature very closely follows the above literature review, that is, while it teaches phosphate bonded systems, it only mentions spinel as one possible aggregate material. Also these aggregates are not "reactive" with any activity absorbed due to free MgO and are typically part of the coarse grained portion with very few fines (material <325 mesh).

BRIEF DESCRIPTION OF THE INVENTION

In accordance with the present invention, effective coating compositions can be produced for application by spray, brush, roller or other means to metal or ceramic surfaces to protect such surfaces from corrosive or abrasive attack. Because this coating adheres strongly to solid surfaces and resists wetting by molten metals, it makes an excellent coating for surfaces used in contact with non-ferrous metals.

The essential ingredients for producing the various compositions are (1) a reactive $MgAl_2O_4$ spinel prepared from a co-precipitated Mg-Al hydroxide calcined to at least 1000 degrees C. up to about 1650 degrees C. (2) phosphoric acid and acid phosphate moieties ($(H_2PO_4)^-$), said phosphoric acid being present in an amount sufficient to provide an excess of free phosphoric acid beyond that which will react rapidly (within minutes to 60 hours) with the other ingredients present and aluminum acid phosphate moieties, (3) water, (4) optionally, non-reactive fillers, colorants and (5), also optionally, handling agents.

The compositions of present invention employing non-hydroxide containing reactive $MgAl_2O_4$ components and fillers in combination with phosphoric acid with or without aluminum dihydrogen phosphate are unique in that the composition produces strong coating yet has a long consistent shelf life up to 60 plus days.

In accordance with the present invention there is described a sprayable coating composition which is usable in, particularly, the metals industry for protection and repair of refractory linings and component parts, for example, in melting furnaces, electrolytic metal winning cells, components parts for ferrous or non-ferrous metal casting machines, including gates, transfer pipes and troughs, nozzles and the like, as well as refractory linings and linings in the chemical and petrochemical industry.

The coating compositions comprise:

15–59% by weight of a $MgAl_2O_4$ spinel, prepared in accordance with the teachings of U.S. Pat. No. 4,400,431 calcined to between about 1000 degrees C. and 1650 degrees C., 0–30% by weight of a substantially non-reactive filler such as tabular alumina, fused grain alumina, fused grain spinel, ($MgAl_2O_4$), highly sintered spinel as well as other fused grain materials such as $ZrSiO_4$, 8 to 42% by weight of $H_3PO_4$ with or without inorganic acid phosphate moieties (e.g. $Al(H_2PO_4)_3$) capable of forming $(PO_3)^-{}_n$ moities on heating or drying out of the formulation at above about 200° C.

33–52% by weight total water in the formulation,

0–5% by weight of handling agents.

Water is employed as necessary to give flowability to the binder composition, as are handling agents. Total water content usually employed is from about 33 to about 52 weight percent of the total composition.

Modifiers including handling and set modifiers as well as colorants and the like. Handling and set modifiers include activated alumina, fused alumina ($Al_2O_3$), glycerine, polyvinyl alcohol, MgO, $Mg(OH)_2$ or mixtures of two or more, employed in from 0 to about 5 weight percent of the total composition. Other well known handling and set modifiers may be employed. It is to be understood that included within the definition of modifiers are the inorganic coloring agents.

Depending upon the ultimate use to which the composition is to be put, various fillers, fibers, aggregates and the like may be added to give compression strength, reduce density and/or improve bond strength and insulating properties are obtained by incorporating these materials in conventional coatings.

Formulations containing the aforedescribed components are hereafter set forth in tabular form to illustrate the variety of mixtures of those components within the scope of the present invention which produce commercially available coatings for ceramic and metallic bodies which are to be put into severe corrosive and/or temperature service.

The following table illustrates the preferred operable ranges of general components falling within the present invention as well as two examples of coating compositions, comparative Examples A and B, which do not contain free phosphoric acid and thus fall outside the scope of this invention. It should be noted that while these examples produce coatings which were serviceable during small scale testing, they did not adhere well to metal surfaces and thus lack the general utility of commercially acceptable coatings for both metal and ceramic surfaces.

| Example | MgAl$_2$O$_4$ | | | | Filler | |
|---|---|---|---|---|---|---|
| | 1650°$^a$ | 1500°$^a$ | 1000°$^a$ | 500°$^a$ | fused Al$_2$O$_3$ | sintered Al$_2$O$_3$ |
| A* | — | 28.1 | — | 2.2 | 27.6 | — |
| B* | — | 27.7 | — | 2.2 | 27.2 | — |
| 1 | 33.1 | — | — | — | 11.3 | 11.3 |
| 2 | 33.2 | — | 10.5 | — | — | — |
| 3 | 32.5 | — | 10.3 | — | — | — |
| 4 | — | — | 24.4 | — | — | — |
| 5 | 34.1 | — | 10.6 | — | — | — |

$^a$firing temperature of the spinel
*Comparative examples

| Example | Al(H$_2$PO$_4$) | H$_3$PO$_4$ | H$_2$O | Modifiers fumed Al$_2$O$_3$ |
|---|---|---|---|---|
| A* | 12.6 | — | 29.6 | — |
| B* | 12.4 | — | 29.2 | 1.3 |
| 1 | 9.5 | 0.9 | 33.9 | — |
| 2 | 17.8 | 0.8 | 37.6 | — |
| 3 | 17.5 | 0.8 | 36.8 | 2.2 |
| 4 | 35.6 | 1.7 | 38.3 | — |
| 5 | 9.8 | 0.53 | 43.9 | 1.1 |

*Comparative examples

IN THE DRAWING

The graphical illustration in the drawing represents the composition of the three principal components of the present invention compared to the same components in U.S. Pat. No. 4,459,156, a closely related disclosure.

DETAILED DESCRIPTION OF THE INVENTION

In the following examples, unless otherwise denoted, the reactive MgAl$_2$O$_4$ spinel is derived from a coprecipitation process in which a mixture of magnesium aluminum hydroxides(Mg$_x$Al$_y$(OH)$_z$) and aluminum hydroxides and/or aluminum oxyhydroxides are produced which are then heated to between about 1000 degrees C. and 1650 degrees C. to convert the hydroxides to their oxides form. The magnesium aluminum hydroxide phase represented above may contain other anions partially substituting for hydroxide (e.g. Cl$^-$, NO$_3$$^-$, SO$_4$$^=$, CO$_3$$^=$), the presence and amount of which will be determined by the type of reactant salts used in the coprecipitation and the type and duration of subsequent treatments, chemical or thermal, to which the precipitate phase has been subjected. The co-precipitate of magnesium/aluminum and aluminum hydroxy compounds is referred to as spinel precursor. The overall Al/Mg ratio with this mixture will be very nearly 2.0, unless otherwise noted. If this ratio significantly deviates from 2.0 (e.g. <1.90 or <2.10) segregated MgO and/or Al$_2$O$_3$ phases are normally observed in the calcined or sintered product and these can affect reactivity, as is discussed in copending application, Attorney's Docket No. 32, 777.

The Al(H$_2$PO$_4$)$_3$, H$_3$PO$_4$, fused grain Al$_2$O$_3$, fumed alumina, tabular alumina etc. are all commercially available, substantially pure compounds and/or solutions. The sintered spinels may be commercially available fused grain material or a highly sintered, above 1650 degrees C. spinel prepared in accordance with U.S. Pat. No. 4,400,431.

Formulations may consist of two main parts, the binder phase, produced by reacting an acidic phosphate species with at least one oxide species, which can be carried out prior to the addition of the aggregate or filler material phase. The latter component(s) may be inert, as in the case of fused grain or tabular Al$_2$O$_3$, or highly sintered (>1650 degrees C.) MgAl$_2$O$_4$, or may have some degree of reactivity, as in the case of MgAl$_2$O$_4$ sintered to <1650 degrees C. or calcined Al$_2$O$_3$. The degree of activity is due to changes in surface area, degree of crystalline perfection and/or population of surface hydroxyls available for reaction which result from the calcining and/or sintering treatments.

The preferred manner of preparing formulations of the present invention is to combine the reactive spinel, the inert fillers if used, and any other solid components, as a dry mix then adding the dry mix to the liquid component(s) Although reverse mixing may be employed it is easier and requires less energy intensive mixing to add the dry mix to the liquid.

COMPARATIVE EXAMPLE A

Magnesium aluminum spinel produced by the method of U.S. Pat. No. 4,400,431 and calcined at 500 degrees C. in the amount of 55 g. is combined with 693 g. of such spinel calcined at 1500 degrees C. and 682 g. of fused alumina and mixed. This is slurried in a solution of 310 g. of Al(H$_2$PO$_4$)$_3$ in 730 g. of water to produce a sprayable coating which was applied to an alumino silicate fiber board, dried, then cured at 900 degrees F. (480 degrees C.) This coated board was tested in molten aluminum alloy service and showed no evidence of wetting or attack, while the metal bonded to the surface of an unsprayed board.

COMPARATIVE EXAMPLE B

Adding 33 g. of fumed alumina to the above formulation improved sprayability significantly with no apparent loss in performance.

Neither of these formulations bonded well to metal mold surfaces.

EXAMPLE 1

A concentrate was prepared by slurrying 1260 g. of magnesium aluminum spinel which had been sintered at 1650 degrees C. along with 430 g. each of sintered alumina and fused alumina in a solution of 253.8 g. Al(H$_2$PO$_4$)$_3$ and 34 grams H$_3$PO$_4$ in 334.8 g. of H$_2$O. Immediately prior to use, the concentrate was mixed with 1060 g. of a 10% aqueous solution of Al(H$_2$PO$_4$)$_3$.

The coating was sprayed onto a heated spinel-/aluminum phosphate bonded silicon carbide crucible and cured. This treatment sealed the surface and showed no evidence of corrosive attack in over thirty melts of non-ferrous metal alloys.

EXAMPLE 2

To prepare a mold wash to protect a steel mold to be used in casting magnesium, 4.65 kg. of magnesium aluminum spinel sintered at about 1650 degrees C. and 1.47 kg. of spinel calcined at 1000 degrees C. are suspended in a solution of 2.5 kg. of Al(H$_2$PO$_4$)$_3$ and 119 g. H$_3$PO$_4$ in 5.27 kg. of H$_2$O.

When this formulation was sprayed onto a clean steel mold used to cast magnesium parts, 36 castings were made with only a single minor repair required. At the end of this run, the coating was still in good condition. Other commercially available coatings tested required recoating every few castings.

EXAMPLE 3

While the coating produced in Example 3 is excellent, the formulation has a tendency to settle, and required significant mixing immediately prior to use. To reduce this problem, 315 g. of fumed alumina were added.

This greatly reduced the settling, with no discernable degradation in the quality of the coating. When this coating was tested on mold for casting magnesium ingots it exhibited good release from the ingot and retention on the mold. Application was by spray gun with curing induced by the ingot mold preheaters.

EXAMPLE 4

To prepare a mold wash to protect a steel mold to be used in casting magnesium wheels 300 g. of magnesium aluminum spinel calcined at 1000 degrees C. was suspended in a solution of 437.5 g. of Al(H$_2$PO$_4$)$_3$ and 20.4 grams H$_3$PO$_4$ in 471 g. H$_2$O. This coating was sprayed on the mold and gave good release and resistance to abrasion.

EXAMPLE 5

A coating for a steel mold was prepared employing

| weight percent | component |
| --- | --- |
| 34.13 | 1600–1650 degrees C. sintered MgAl$_2$O$_4$ |
| 10.59 | 1000 degrees C. calcined MgAl$_2$O$_4$ |
| 1.06 | fumed Al$_2$O$_3$ |
| 9.81 | Al(H$_2$PO$_4$)$_3$ |
| 0.53 | H$_3$PO$_4$ |
| 43.90 | H$_2$O |

The coating was tight and provided good mold release in magnesium molding service.

We claim:
1. A coating composition consisting of
    (1) 15–59 weight percent of a reactive densifiable MgAl$_2$O$_4$ calcined to a temperature of between about 1000° C. and 1650° C. derived from a co-precipitated Mg-Al hydroxide;
    (2) 0–30 weight percent of a substantially non reactive filler;
    (3) 8–42 weight percent of an acidic phosphate material capable of decomposition on heating to provide (PO$_3$)$^-$ moieties, at least a part of which is C-32931-B available as free phosphoric acid in the final composition and and is present in an amount sufficient to provide an excess over that which will react with any other ingredient(s) present during mixing and/or storage
    (4) 36.8 to 52 weight percent water; and
    (5) 0–5 weight percent modifiers.
2. The coating composition of claim 1 wherein a mixture of 1650 degrees C. calcined MgAl$_2$O$_4$ and 1000 degrees C. calcined MgAl$_2$O$_4$ is employed.
3. The coating composition of claim 1 wherein about 33% by weight of 1650 degees C. calcined MgAl$_2$O$_4$ is employed.
4. The coating composition of claim 1 wherein about 33% by weight of 1650 degrees C. calcined MgAl$_2$O$_4$, about 10% by weight of 1000 degrees C. calcined MgAl$_2$O$_4$ is employed.
5. The coating composition of claim 1 wherein about 24% by weight of 1000 degrees C. calcined MgAl$_2$O$_4$ is employed.

* * * * *

UNITED STATES PATENT AND TRADEMARK OFFICE
CERTIFICATE OF CORRECTION

PATENT NO. : 4,834,798

DATED : May 30, 1989

INVENTOR(S) : Alan J. Cisar and Walter W. Henslee

It is certified that error appears in the above-identified patent and that said Letters Patent is hereby corrected as shown below:

Column 2, Line 36; change "components" to --component--.

Column 2, Line 62; change "fused" to --fumed--.

Column 4, Line 11; change the less than sign "<" to a greater than sign -->-- between "or" and "2.10".

Column 5, Line 30; change "required" to --requires--.

Column 6, Line 27; delete "C-" at end of line.

Column 6, Line 28; delete "32931-B" at beginning of line.

Signed and Sealed this

Eleventh Day of September, 1990

Attest:

HARRY F. MANBECK, JR.

*Attesting Officer*         *Commissioner of Patents and Trademarks*